United States Patent [19]

McKinney

[11] 4,206,409
[45] Jun. 3, 1980

[54] MOTOR VEHICLE COMMUNICATION APPARATUS

[76] Inventor: Samuel A. McKinney, 1795 Foleyet Crescent, Pickering, Canada, L1V-2X8

[21] Appl. No.: 879,132

[22] Filed: Feb. 21, 1978

[51] Int. Cl.² .............................................. H04B 1/38
[52] U.S. Cl. ................................ 455/345; 179/1 VE; 455/89
[58] Field of Search ............... 325/111, 117, 118, 161, 325/312, 361; 179/1 VE; 280/202; 224/32 A

[56] References Cited

U.S. PATENT DOCUMENTS

| 2,109,315 | 2/1938 | Harley | 224/32 |
| 2,133,855 | 10/1938 | Flyer | 250/33 |
| 3,586,977 | 6/1971 | Lustig | 325/16 |
| 3,625,405 | 12/1971 | Kezar | 224/32 A |
| 3,944,924 | 3/1976 | Miyachi | 325/16 |

FOREIGN PATENT DOCUMENTS 1559766 3/1969 France .
4593 3/1916 United Kingdom .

Primary Examiner—Robert L. Griffin
Assistant Examiner—Peter Durigon
Attorney, Agent, or Firm—Robert D. Farkas

[57] ABSTRACT

A motor vehicle communication apparatus utilizes a housing having a pair of removeable helmets disposed therein, each carrying a microphone and receiver combination coupled to a receptacle disposed on the outside surfaces thereof. The housing is provided with a pair of reels, each carrying a plug-like device affixed to the end of an electrical cable for purposes of coupling the helmets to the electrical communication devices mounted within the housing including a radio receiver, an intercommunication amplifier and, if desired, a transceiver. A control box, remotely located from the housing, electrically operates each of the electronic devices carried by the housing and is readily accessible to the operator of the motor vehicle.

5 Claims, 2 Drawing Figures

MOTOR VEHICLE COMMUNICATION APPARATUS

BACKGROUND OF THE INVENTION

1. The Field of the Invention

This invention relates to motor vehicle communication devices and more particularly to that class of apparatus utilized for intercommunication purposes between motorcyclists.

2. Description of the Prior Art

The prior art abounds with motorcycle helmets having receivers and microphones mounted thereon. U.S. Pat. No. 3,586,977 issued Jan. 22, 1971 to H. V. Lustig et al. teaches a system providing voice intercommunication between a motorcycle rider and a passenger when both are wearing motorcycle helmets. The system employs a transistor radio with switching means to enable it to be used selectively for intercommunication purposes and for receiving radio broadcasts. However, such apparatus teaches direct interconnection between a pair of helmet apparatuses, utilizing an electrical cable therefor, thus necessitating that the individual riders couple and decouple from one another electrically when mounting the bicycle or when demounting from same. Furthermore, the entire apparatus fails to provide a storage facility for the assembled devices when not in use.

U.S. Pat. No. 3,889,190 issued June 10, 1975 to C. Palmer teaches a transceiver mounted at one end of a tubular rod, the other end of which is pivotably mounted to a helmet above the wearer's ear. An earphone is mounted on the rod adjacent the wearer's ear and the rod is bent so the transceiver, which contains a microphone, is in front of the wearer's mouth. An antenna extends from the transceiver to a position above the helmet. The pivotal mount allows the rod to be positioned above the wearer's head when the transceiver is not in use. The Palmer apparatus, though effectively supporting a transceiver from a helmet-like device, fails to provide storage facilities for each component of the apparatus when such apparatus is not in a use condition. Furthermore, such apparatus is extremely heavy to wear and is limited to radio communications techniques between another similarly equipped.

SUMMARY OF THE INVENTION

A primary object of the present invention is to provide an apparatus which is capable of receiving radio signals and for direct electrical intercommunication between riders of a bicycle.

Another object of the present invention is to provide an apparatus wherein all of the components thereof, including the helmet portion, may be stored on the motor vehicle when not is use.

Still another object of the present invention is to provide an apparatus which is free from theft capabilities yet provide a storage source for a removeable helmet.

Yet another object of the present invention is to provide an apparatus which may be effectively employed by one or two users on a motorcycle.

A further object of the present invention is to provide an apparatus which enables the users to decouple or couple themselves to the motor vehicle without requiring electrical cables extending between one another, thereby facilitating rapid mounting and demounting from the vehicle when desired.

Heretofore, electrical communication devices, often found on motorcycles, comprised a motor vehicle having a receiver mounted thereon which produced audible tones carried to the users of the vehicle in conventional fashion. With the advent of larger and necessarily nosier vehicles, motor bicycle riders were forced to resort to earphones electrically coupled to a receiver, often carried by the wearer himself. This placed an additional burden in the form of bulk, forced to be carried by such a bearer. Electrical communications, utilizing amplifiers and the like, between a pair of riders on the same motor bicycle, required electrical interconnection between such riders. Such interconnections, in the form of a cable extending between the pair of helmets, required team effort in order to allow the riders to electrically disconnect themselves from one another or to electrically couple up their electronic devices carried by their respective helmets. The present invention recognizes these problems and provides a ready solution to same as well as providing a solution for the storage of the helmets and for a means of allowing the riders to assume any individual position, irrespective of the positions assumed by their companion, and irrespective of a fixed location relative to their seat location on the motor bicycle. Furthermore, all of the electronic devices, carried by the motor bicycle are caused to be operated by a central control panel disposed adjacent the steering column of the vehicle, thereby enabling the motor vehicle operator to transfer the mode of operation of each of the devices from radio receiver, radio transceiver, intercommunication or the like, as desired. Since the cord coupling each of the head carried helmets is retractable into a central housing carried by the vehicle, each rider may disassemble his helmet independently from the other and store same in the housing carrying the cord storage reels. Thus, the electronic devices, the cord storage reels, and the helmets are totally secured from the weather and from theft when not in use. The only exposed portions of the apparatus comprise the control box disposed adjacent the steering column of the vehicle. Since each apparatus is permanently secured to the vehicle, theft of same is limited.

These objects as well as other objects of the present invention will become more readily apparent after reading the following description of the accompanying drawings.

DESCRIPTION OF THE PREFERRED EMBODIMENT

The structure and method of fabrication of the present invention is applicable to a housing having a hingeable lid portion. The housing is affixed to the rear portions of the the motor vehicle, preferably having the lid portion disposed in a convenient manner providing access to the interior of the housing. The lid is provided with a hasp or locking device such that the housing may be closed when desired. Disposed within the housing are a pair of spring biased reels, each carrying an electrical cable thereon. One end of the electrical cable passes through an opening in the housing and is equipped with a plug. The housing is of sufficient size to contain therein a pair of helmets, each having a receiver disposed adjacent the ear portions thereof and a microphone extending about the face region, preferably in the mouth region of the user. Each helmet is provided with a receptacle adapted to receive therein the plug portion aforementioned.

The reels are provided with a stationary contact and rotor contact plate assembly electrically coupled to the other end of the cable carried on the reel. The stationary contacts are in turn electrically coupled to a plurality of electronic devices including a radio receiver, an amplifier device and, if desired, a communications band transceiver. Each of such electrical devices are electrically connected to a harness which extends outwardly from the housing and has portions thereof electrically coupled to the battery of the vehicle and a control box. The control box is mounted mechanically adjacent the steering column of the vehicle, in a convenient location adjacent the hands of the operator of the motor bicycle. In this fashion, the operator of the vehicle may operate the controls of the control box. Each of the controls of the control box operate the vital controls of the electronic devices, such as the receivers, amplifier and transceiver apparatuses. It is to be noted that there is no direct electrical interconnection utilizing an electrical cable directly between each of the helmets when worn by the two users thereof. Electrical interconnections operate only between the helmets and the housing carrying the electronic devices. Furthermore, the helmets may be stored within the housing when not in use. Thus, the users may intercommunicate with one another, utilizing the amplifier therefor, or receive radio communications from either the transceiver or radio receiver, or if desired, transmit directly, singly or in concert, utilizing their microphone apparatuses over the transmitter portion. One or two operators each may receive or transmit or intercommunicate, as desired. Battery power, utilizing the motor bicycle battery as a power source, provides operating energy for the electronic devices whose receivers may be extended a virtually unlimited distance from the motorcycle, utilizing the storage facility of the reels therefor.

Figure 1:
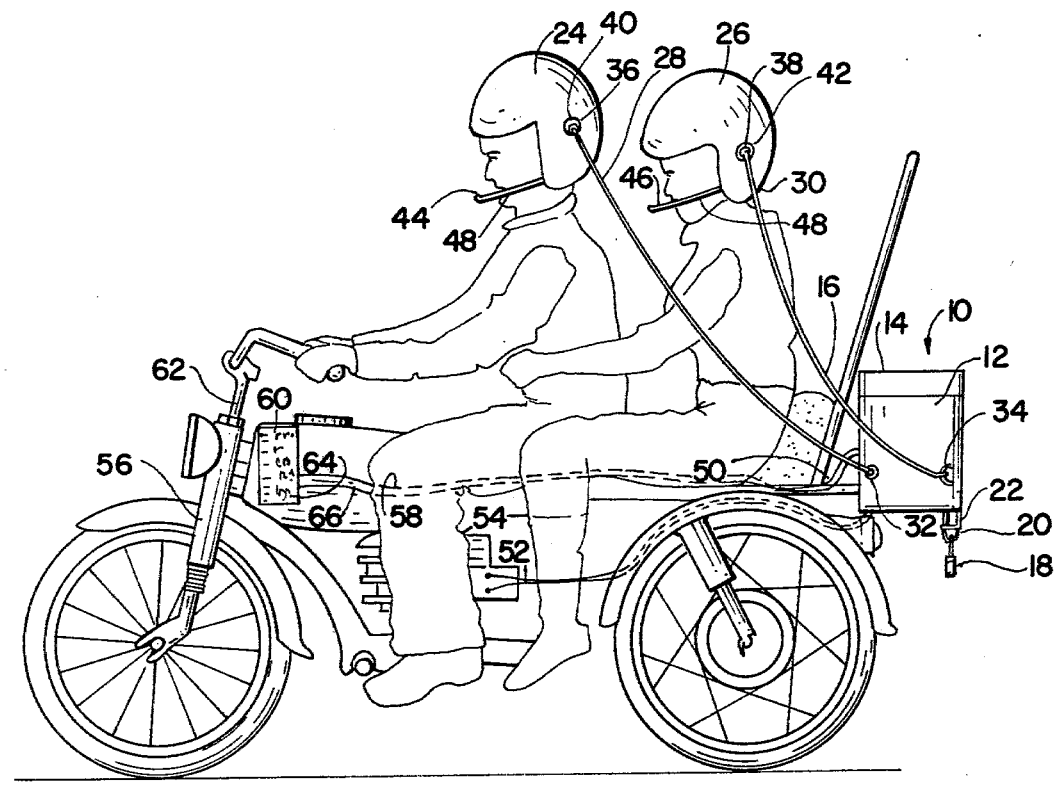
FIG. 1 is a side elevation view of the present invention shown carried on a motor bicycle.

Now referring to the figures, and more particularly to the embodiment illustrated in FIG. 1 showing the present invention 10 comprising a housing 12 having a lid portion 14 hingeably secured thereto utilizing a hinge therefor. Lock 18 passes through hasp portion 20 so as to retain hasp plate 22 in a secured position, maintaining lid portion locked. Helmets 24 and 26 are shown each employing electrical cables 28 and 30, each electrically coupled to the interior of housing 12. Cables 28 and 30 pass through openings 32 and 34 of housing 12. Plugs 36 and 38 interconnect removeably to receptacles 40 and 42, carried by helmets 24 and 26 respectively. Microphone portions 44 and 46 are each suspended from arms 48 carried by the helmets 24 and 26. Cable 50 emerges from housing 12 and has portion 52 thereof electrically coupled to battery 54 carried by motor bicycle 56. Cable portion 66 and 58 electrically communicates with control housing 60, shown carried by motor bicycle 56 adjacent steering column portion 62 thereof. Switches 64 are disposed on the outermost surface of control housing 60.

Figure 2:
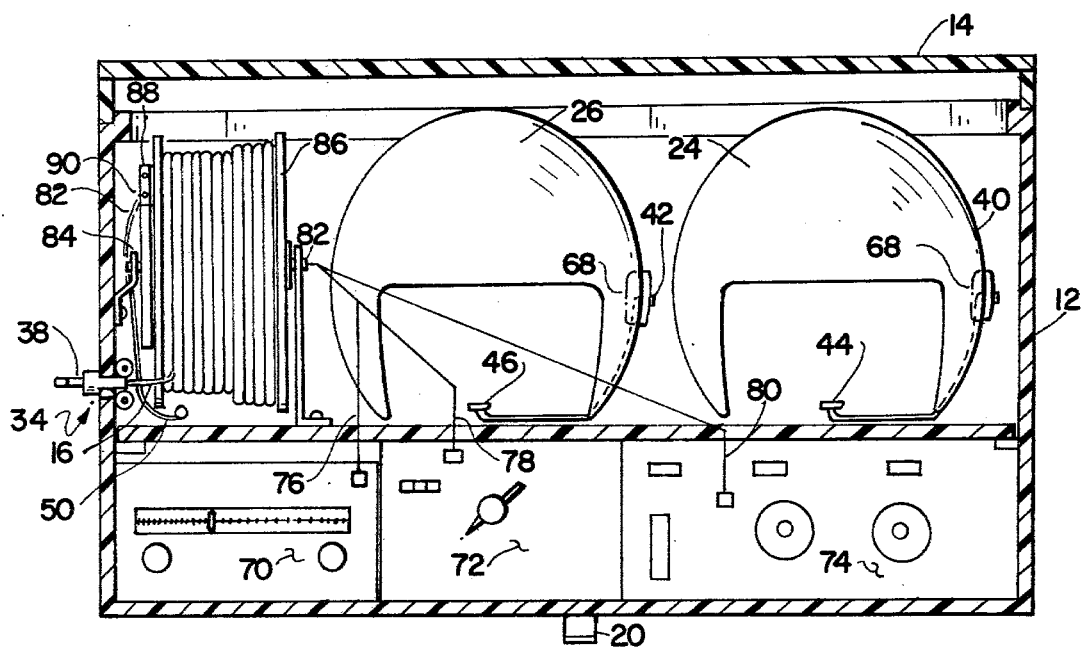
FIG. 2 is a rear elevation, cross sectional view of a portion of the present invention.

FIG. 2 illustrates housing 12 having helmets 26 and 24 disposed in the storage position therewithin. Receivers 68 are shown in the interior of helmets 24 and 26, adjacent receptacle portions 40 and 42 thereof. Radio receiver 70, amplifier 72, and Citizen's Band transceiver 74 are shown stored in housing 12, employing cable portions 76, 78 and 80 respectively, to provide electrical coupling to main cable portion 82 passing through stationary shaft 84 of reel 86 and engaging stationary contacts 88. Rotor-like contact plate 90, disposed on reel 86, engages electrical cable 16. Thus, plug 38 is electrically interconnected to electronic devices 70, 72 and 74. Another storage reel, not shown, disposed behind reel 86, is provided having another plug, shown as plug 36 in FIG. 1, for electrical interconnection to receptacle 40 of helmet 24. Main cable 82 branches off so as to feed such other reel in a fashion similar to reel 86 disposing receiver 68 and microphone 44, each carried by helmet 24, electrically interconnected with receiver 68 and microphone 46 in appropriate fashion for concurrent listening and voice transmission as required or for receiving and cross transmitting when amplifier 72 is employed.

One of the advantages of the present invention is an apparatus which is capable of receiving radio signals and for direct electrical intercommunication between riders of a bicycle.

Another advantage of the present invention is an apparatus wherein all of the components thereof, including the helmet portion, may be stored on the motor vehicle when not in use.

Still another advantage of the present invention is an apparatus which is free from theft capabilities yet provide a storage source for a removeable helmet.

Yet another advantage of the present invention is an apparatus which may be effectively employed by one or two users on a motorcycle.

A further advantage of the present invention is an apparatus which enables the users to decouple or couple themselves to the motor vehicle without requiring electrical cables extending between one another, thereby facilitating rapid mounting and demounting from the vehicle when desired.

Thus, there is disclosed in the above description and in the drawings, an embodiment of the invention which fully and effectively accomplishes the objects thereof. However, it will become apparent to those skilled in the art, how to make variations and modifications to the instant invention. Therefor, this invention is to be limited, not by the specific disclosure herein, but only by the appended claims.

The embodiment of the invention in which an exclusive privilege or property is claimed are defined as follows:

1. A motor vehicle communication apparatus comprising a housing, at least a pair of helmets, each of said at least a pair of helmets having a microphone and a receiver mounted thereon, said each of said helmets having a receptacle secured thereto, said receptacle electrically coupled to said microphone and said receiver, a pair of reels, a radio receiver, said radio receiver carried by said housing, an amplifier, said amplifier carried by said housing, said housing configured to have said at least said pair of helmets stored therewithin, said pair of reels enclosed within said housing, a cable, a control box, a plurality of switches, said control box carrying said plurality of switches, said cable electrically interconnecting said plurality of switches and said amplifier and said radio receiver, said each of said reels carrying an electrical cable wound thereon, said electrical cable having a plug secured to the free end thereof, said plug for removeable electrical engagement with said receptacle, the other end of said electrical cable electrically coupled to said cable, said radio receiver electrically coupled to said cable, said amplifier electrically coupled to said cable.

2. The apparatus as claimed in claim 1 further comprising a communications band transceiver, said communications band transceiver carried by said housing, said communications band transceiver electrically coupled to said cable.

3. The apparatus as claimed in claim 1 wherein a portion of said cable passes through an opening in said housing.

4. The apparatus as claimed in claim 1 further comprising a lid, said lid hingeably secured to said housing, means to secure said lid in locked position.

5. The apparatus as claimed in claim 1 wherein said housing is carried on a motor bicycle, said control box being carried by said motor bicycle, said control box being secured to said motor bicycle adjacent the front fork regions thereof.

* * * * *